United States Patent [19]

Morita et al.

[11] Patent Number: 4,899,456

[45] Date of Patent: Feb. 13, 1990

[54] SURFACE CONTOUR MEASURING TRACER

[75] Inventors: Hideo Morita; Kenji Abiko; Katsuaki Anzawa, all of Kawasaki, Japan

[73] Assignee: Mitutoyo Corporation, Tokyo, Japan

[21] Appl. No.: 235,360

[22] Filed: Aug. 23, 1988

[30] Foreign Application Priority Data

Aug. 24, 1987 [JP] Japan .................................. 62-210426
Aug. 24, 1987 [JP] Japan .................................. 62-210427

[51] Int. Cl.$^4$ .............................................. G01B 7/28
[52] U.S. Cl. ........................................ 33/561; 33/559
[58] Field of Search .................... 33/169 R, 551, 556, 33/559, 561

[56] References Cited

U.S. PATENT DOCUMENTS

| | | |
|---|---|---|
| 3,869,799 | 3/1975 | Neuer et al. |
| 3,883,956 | 5/1975 | Zeewy et al. ................ 33/559 |
| 4,155,173 | 5/1979 | Sprandel ..................... 33/559 |
| 4,523,383 | 1/1985 | Rogers et al. .............. 33/169 R |
| 4,530,159 | 7/1985 | Ernst .......................... 33/559 |
| 4,535,534 | 8/1985 | Linder ......................... 33/559 |
| 4,562,646 | 1/1986 | Dall'Aglio ................... 33/559 |
| 4,563,823 | 1/1986 | Klingler et al. ............. 33/169 R |
| 4,578,873 | 4/1986 | Klingler et al. ............. 33/559 |
| 4,611,403 | 9/1986 | Morita et al. ............... 33/561 |
| 4,716,656 | 1/1988 | Maddock et al. ............ 33/561 |
| 4,763,421 | 8/1988 | Feichtinger ................. 33/561 |

FOREIGN PATENT DOCUMENTS

| | | | |
|---|---|---|---|
| 0014109 | 2/1981 | Japan ............................. | 33/169 R |
| 61-50007 | 3/1986 | Japan . | |
| 0209833 | 9/1986 | Japan ............................. | 33/169 R |
| 2078399 | 1/1982 | United Kingdom .............. | 33/556 |

Primary Examiner—William A. Cuchlinski, Jr.
Assistant Examiner—Thomas B. Will
Attorney, Agent, or Firm—Flynn, Thiel, Boutell & Tanis

[57] ABSTRACT

The present invention relates to a surface contour measuring tracer permitting a probe element to move in the directions of X-, Y- and Z-axes. A support structure includes a base supporting thereon an X-slider and a Y-slider which are movable in the directions of X- and Y-axes, respectively. A Z-slider is supported on the X-slider so to be movable in the direction of a Z-axis. Supported on the Z-slider is a probe element, the movements of which in the directions of X-, Y- and Z-axes are permitted by the movements of the X-, Y- and Z-sliders. The X- and Y-sliders are normally held at neutral positions by a wire spring extending in the direction of the Z-axis, and the Z-slider is permitted to move in the direction of the Z-axis against the action of a coil spring and normally held at a neutral position.

9 Claims, 5 Drawing Sheets

SURFACE CONTOUR MEASURING TRACER

BACKGROUND OF THE INVENTION

1. Field of the Invention

The present invention relates to improvements in a surface contour measuring tracer wherein a measuring element supported movably in directions of three axes perpendicularly intersecting one another through an X-, Y- and Z-sliders mounted on a base is moved on a surface of a work in sliding contact therewith to thereby detect a surface contour of the work as an electric signal.

2. Description of the Related Art

There have heretofore been known such contact type surface contour measuring apparatuses, in each of which a surface contour measuring tracer is mounted on a CNC coordinate measuring instrument or the like, and a measuring element (probe) of this tracer is moved on a surface of a work in sliding contact therewith while a surface contour of the work (an object to be measured) is continuously followed and measured.

Heretofore, in general, the surface contour measuring tracer of this type has been of such an arrangement that an X-slider, Y-slider and Z-slider which are movable in directions of respective axes are successively mounted on a base fixedly secured to a CNC coordinate measuring instrument or the like, a measuring element is fixed to one of these sliders, the measuring element is made to be movable in directions of three axes perpendicularly intersecting one another with respect to the base, and, a neutral position holding means is provided for restoring the measuring element to a neutral position with respect to the base, i.e. origins of X, Y and Z when the measuring element is in non-contact with the work. For example, in a surface contour measuring tracer as described in U.S. Pat. No. 3,869,799, respective sliders are carried by parallel springs, movements of the respective sliders in the directions of respective axes are permitted by the parallel springs, measuring forces of the sliders are secured, and further, a neutral position holding means is provided for restoring the measuring element to origins. However, such disadvantages have been presented that an error in the direction of Z-axis generated due to a dispersion in a positional accuracy, non-linear characteristics and degree of deformation is great at the time of assembling and fixing the parallel springs, whereby the directional properties are reflected in the measured values. In contrast thereto, as an improved surface contour measuring tracer wherein stabilized measuring forces (contact forces) or moving properties are provided in the directions of X-, Y- and Z-axes, the measuring element can be easily restored to the neutral position and the following properties to the surface of the work are improved, in Japanese Patent Unexamined Publication No. 61-50007, there is proposed one wherein the parallel springs are removed, the respective sliders are successively and slidably supported in the directions perpendicularly intersecting one another, and the neutral position holding means is formed by return springs, thus obviating the above-described disadvantages.

However, with the conventional surface contour measuring tracer, and particularly, even with the latter improved tracer, requirements at present such as rendering the tracer compact in size and light in weight and performing measuring at high accuracy cannot be satisfied.

More specifically, the sliders are successively assembled slidably in the directions of the axes perpendicularly intersecting one another, that is, a so-called three-stage pile-up system is adopted, whereby the tracer becomes large-sized, thus presenting such disadvantages that, not only a heavy load is imposed on the contact type surface contour measuring apparatus, but also the effective measuring space is reduced to deteriorate the measuring efficiency, and moreover, the work cannot but be limited to a small one.

The neutral position holding means is interposed between the sliders or provided at the outer peripheral portions of the sliders, so that the tracer is further large-sized.

Rendering the surface contour measuring tracer large in size poses the problem of that the performance of the tracer itself cannot be improved beyond a predetermined level. In short, with the construction of the above-described three-stage pile-up system, loads of the sliders other than that provided at the bottom stage are increased, whereby differences occur in the moving properties between the sliders, so that the directional properties in the measured values become large. Biasing forces for the neutral position holding means should be set at large values, so that such problems are presented that it is difficult to reduce the measuring forces, measuring errors easily occur, and it is impossible to measure the contour of plastic product and the like. In addition, the finishing accuracy of parts should be high-leveled for the purpose of smoothly and slidably guiding and connecting the sliders to one another, and excessive amount of labor and excessive time are spent for assembling and adjusting, thus resulting in poor economics.

Further, in general, the neutral position holding means is constituted by an origin restoring means in a horizontal plane and an origin restoring means in a vertical plane, whereby both means become large-sized in construction, so that both means are different in construction, load and biasing force from each other, and accordingly, dispersions in directional properties occur, thereby inducing complicated problem such as natural vibrations.

SUMMARY OF THE INVENTION

The present invention has been developed to obviate the above-described disadvantages of the related art and has as its object the provision of a surface contour measuring tracer compact in size, light in weight and excellent in the directional properties and responsibility.

The present invention is based on the facts that the above-described conventional problems are caused by the constructions of sliders under the three-stage pile-up system, and such an arrangement is adopted that two sliders are directly supported on the base in such a manner as to be slidably guided and positionally regulated, thus obviating the above-described disadvantages.

To achieve the above-described object, according to the present invention, in a surface contour measuring tracer wherein a measuring element supported movably in directions of three axes perpendicularly intersecting one another through an X-, Y- and Z-sliders which are mounted on a base is moved on a surface of a work in sliding contact therewith to thereby detect a surface contour of the work as an electric signal, a hollow portion defined by parallel side surfaces spaced apart in the direction of Z-axis is provided in the base, respective portions of the X-slider and the Y-slider are coupled into the hollow portion, the X-slider is supported on the base in such manners as to be movable in the direction of X-axis and be immovable in the direction of Z-axis, the Y-slider is supported on the base in such manners as to be movable in the direction of Y-axis, be engaged with parallel side surfaces spaced apart in the direction of X-axis to be immovable in the direction of X-axis and be immovable in the direction of Z-axis, and the X-slider and the Y-slider are directly mounted on the base.

According to the present invention with the above-described arrangement, the Z-slider mounted on the X-slider (or the Y-slider) movably in the direction of Z-axis, i.e. the measuring element fixed to the Z-slider is brought into contact with the work and, when the base and the work are moved relative to each other, the X-slider and Y-slider which are directly supported on the base slide in the directions of X- and Y-axes while being positionally regulated in the direction of Z-axis, so that the measuring element can be made to slide smoothly in the directions of the three axes with respect to the base.

BRIEF DESCRIPTION OF THE DRAWINGS

The drawings show one embodiment of a surface contour measuring tracer according to the present invention, in which:

FIG. 1 is a sectional front view thereof;

DETAILED DESCRIPTION OF THE PREFERRED EMBODIMENT

One preferred embodiment of the surface contour measuring tracer according to the present invention will hereunder be described with reference to FIGS. 1 through 5.

The surface contour measuring tracer according to this embodiment is broadly constituted by support structure which includes a base 10, an X-slider 20, a Y-slider 40, a Z-slider 50, a neutral position holding means and a displacement detecting means 80, and is of such an arrangement that a two-stage pile-up system is adopted in which the X-slider 20 and the Y-slider 40 are directly supported on the base 10, and the Z-slider 50 is supported on the X-slider 20 and the neutral position holding means is received in the respective sliders, thus achieving to render the tracer light in weight and compact in size.

Component parts will hereunder be described separately of one another.

The base 10 is fixed to a movable member of a contact type surface contour measuring apparatus, includes a top plate 11, side plates 19l and 19r and a bottom plate 17, and is provided therein with a hollow portion or opening 15 being rectangular in cross section. More specifically, the hollow portion 15 is defined by parallel surfaces including a guide surface 16u of the top plate 11 and a guide surface 16d of the bottom plate 17, which are spaced apart in the direction of Z-axis. The hollow portion 15 is adapted to couple thereinto with a slide member 31 as being a part of the X-slider 20 and slide members 46l and 46r as being parts of the Y-slier 40.

Figure 2:
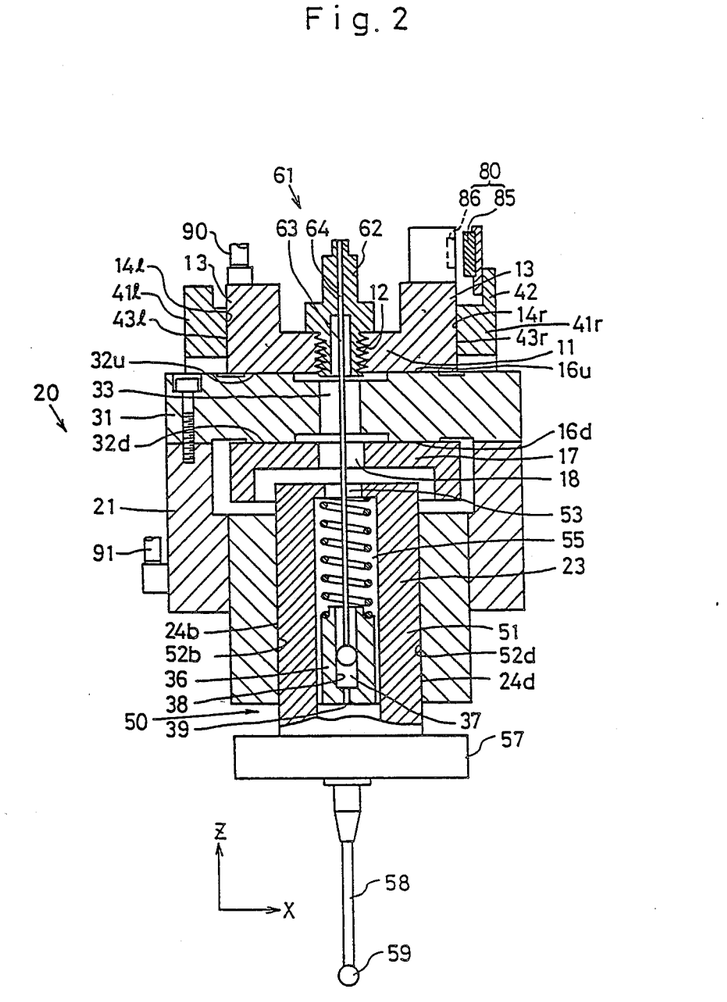
FIG. 2 is a sectional side view in the direction indicated by the arrows from the line II—II in FIG. 1.
Figure 3:
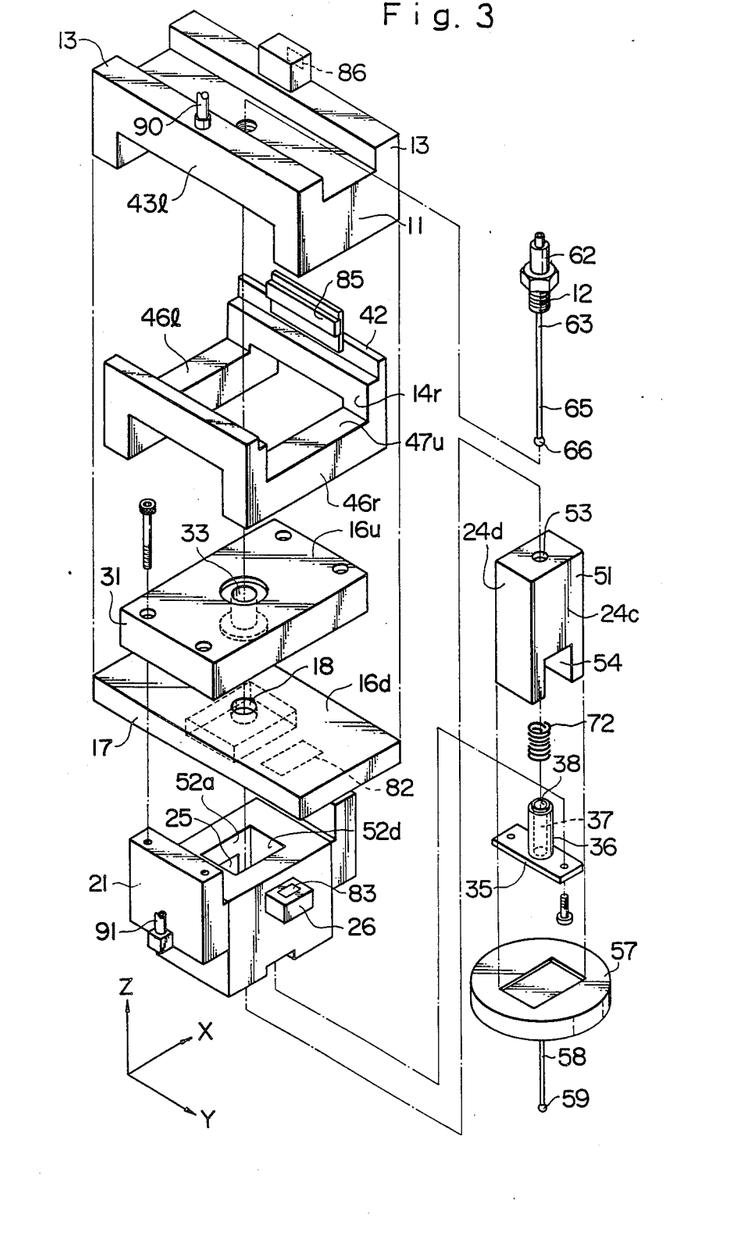
FIG. 3 is an exploded top right perspective view of the support structure for the probe element shown in FIG. 2.
Figure 4:
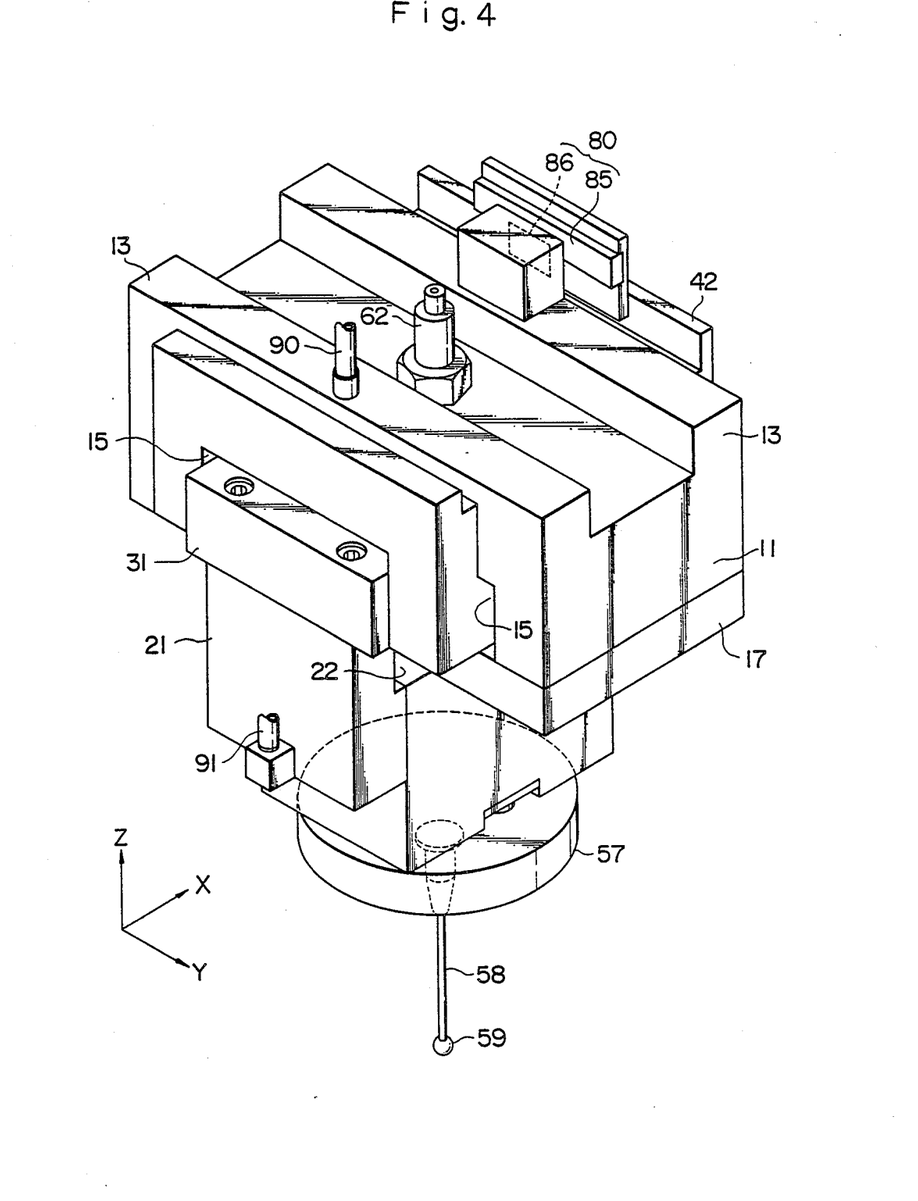
FIG. 4 is a top right perspective view of an assembled support structure for the probe element shown in FIG. 2.
Figure 5:
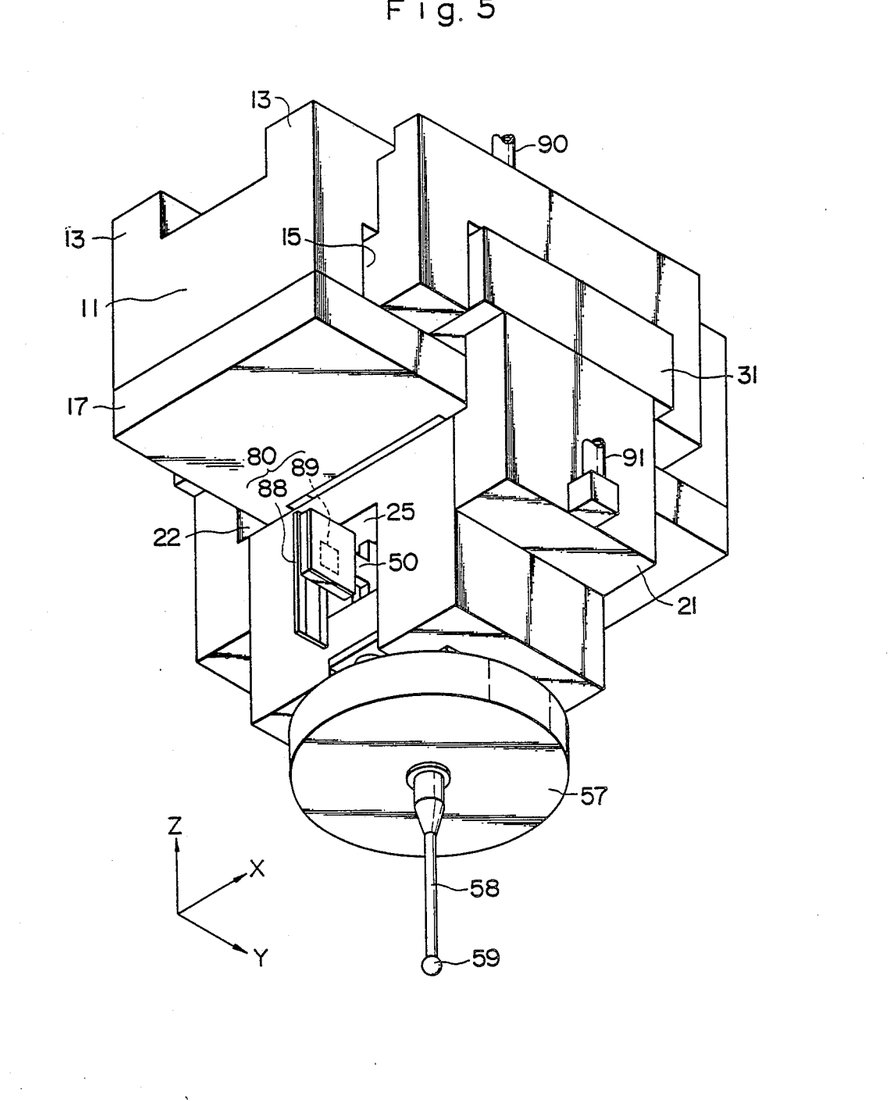
FIG. 5 is a bottom left perspective view of the assembled support structure shown in FIG. 4.

Guide surface 14l and 14r are formed on the outer surface of an erected portion 13 of the top plate 11. These guide surfaces 14 and 14r are brought into abutting contact with sliding surfaces 43l and 43r as shown in FIG. 2, to thereby regulate the movement of the Y-slider 40 in the direction of X-axis. In consequence, without taking the conventional manner in which the Y-slider 40 is movably supported on the X-slider 20, or conversely, the X-slider 20 is movably supported on the Y-slider 40, both sliders 20 and 40 are directly, slidably guided on the base 10 (moreover, on one and the same horizontal plane), so that at least reduction in length in the direction of Z-axis can be effected. An internal thread 12 is provided at the central portion of the top plate 11, and a through-hole 18 is formed at the central portion of the bottom plate 17.

The X-slider 20 includes: a prism-shaped main body 21; a slide member 31 boltedly fixed to a top portion of this main body 21; and a cover member 35 boltedly fixed to a bottom portion of the main body 21. The slide member 31 is coupled into the hollow portion 15 of the base 10, with a sliding surface 32u thereof being in close contact with the guide surface 16u and a sliding surface 32d thereof being in close contact with the guide surface 16d. Consequently, when compressed air is fed to the both surfaces 16u and 16d from an air pipe 90 mounted to the base 10 to form as pneumatic bearing, the slide member 31 (the X-slider 20) is made immovable in the direction of Z-axis and movable in the direction of X-axis. Incidentally, the slide member 31 is also movable in the direction of Y-axis in its relationship with the slider 40. A square-shaped hollow portion 23 extends through the central portion of the main body 21 in the direction of Z-axis. In the hollow portion 23, guide surfaces 24a to 24d are formed on four inner surfaces, and compressed air is spurtingly fed into the hollow portion 23 from an air pipe 91. A cylindrical portion 36 is upwardly erected at the central portion of the cover member 35 boltedly fixed to the bottom portion of the main body 21.

On the other hand, the Y-slider 40 includes: a pair of top plates 41l and 41r which interpose the base 10 therebetween in the direction of X-axis and are opposed to each other; a pair of bottom plates 49l and 49r (49r is not shown); and side plates 45l and 45r which connect these top plates to the bottom plate (constituted by a pair interposing the base 10 in the direction of X-axis therebetween), with the planar shapes thereof being assembled into a # shape. Then, as shown in FIG. 1, a slide member 46l penetrating the hollow portion 15 of the base 10 in the direction of X-axis and being coupled thereinto is provided between the side plates 45l, and similarly, a slide member 46r is provided between the side plates 45r. These slide members 46l and 46r are equal in dimension in the direction of Z-axis to the slide member 31 of the X-slider 20, and interpose therebetween the slide member 31 in the direction of Y-axis through the pneumatic bearing formed by the supply of air from the air pipe 90. Formed on the top side of the slide members 46l and 46r are sliding surfaces 47u and 47u, and formed on the bottom side of the slide members 46l and 46r are sliding surfaces 47d and 47d. In consequence, when compressed air is fed from the air pipe 90 to the guide surfaces 16u and 16d of the base 10 to form a pneumatic bearing, the Y-slider 40 cannot move in the direction of Z-axis but can move in the direction of Y-axis with low friction.

Incidentally, positional regulation of the Y-slider 40 in the direction of X-axis is effected by cooperation of the guide surfaces 14*l* and 14*r* which are provided on the outer surface of the erected portions 13 and 13 of the base 10 and the sliding surface 43*l* and 43*r*. Pneumatic bearings are formed on the guide surface 14*l* and 14*r*, thus permitting the Y-slider 40 to move smoothly in the direction of Y-axis.

Next, the Z-slider 50 secured at the bottom end thereof with a measuring element 58 (having a probe 59) through a collar 57 is formed by a prism-shaped main body 51 provided thereon with a hollow tubular portion 55 being circular in cross section. A top opening 53 is provide on the top end of the Z-slider 50. Four side peripheral surfaces of the main body 51 form sliding surfaces 52*a* to 52*d* which correspond to the guide surfaces 24*a* to 24*d* of the X-slider 20. More specifically, the Z-slider 50 is coupled into the X-slider 20 and can move in the direction of Z-axis with low friction through a pneumatic bearing formed by compressed air fed from the air pipe 91. The square-shaped hollow portion 23 of the X-slider 20 and the prism-shaped main body 51 of the Z-slider 50 display a rotation locking function against the X-slider 20 about the Z-axis of the Z-slier 50.

As described above, both the X-slider 20 and the Y-slider 40 are directly guided and supported on the base 10 and the Z-slider 50 is guided and supported on the X-slider 20, whereby, when a biasing force from the work due to a change in shape is applied to the measuring element 58, the measuring element 58 is displaced in the directions of three axes, and displacement values thereof are detected as movement values of the respective sliders. A displacement detecting means 80 provided for this purpose includes an X-sensor, Y-sensor and a Z-sensor. The X-sensor is constituted by a scale 82 secured to the base 10 and a detector 83 fixed to a projected portion 26 of the X-slider 20. The Y-sensor is constituted by a scale 85 secured to an erected portion 42 of the Y-slider 40 and a detector 86 fixed to an erected portion 13 of the base 10. The Z-sensor is constituted by a scale 88 mounted integrally on the X-slider 20 and a detector 89 fixed to the Z-slider 50 through a support member 56 penetrating an opening 25 of the X-slider 20 from inside to outside. All of these sensors are of photo-electric type.

Next, the neutral position holding means is a means for constantly holding a position of the measuring element 58 with respect to the base 10 at all times in a state of non-contact wherein no biasing force is applied to the measuring element 58 (probe 59) from the work, and, in this embodiment, is constituted by an X-Y origin restoring means 61 for restoring and holding the measuring element 58 to the origins within the X and Y planes and a Z origin restoring means 71 for restoring and holding the measuring element 58 to the origin on the Z-axis. First, the X-Y origin restoring means 61 is formed of a so-called wire spring 63 of a rod shape, a proximal end 64 thereof is fixed to the base 10 through a nut member 62 threadably coupled to the internal thread 12 in such a manner as to be positionally adjustable in the direction of Z-axis, and a ball 66 capable of sliding in the direction of Z-axis is mounted to a hollow cylindrical portion 37 of the X-slider 20 at the distal end 65 of the means 61. Incidentally, contrary to this, if the proximal end 64 is made slidable in the direction of Z-axis with respect to the base 10 and the distal end 65 is fixed to the X-slider 20 or the Z-slider 50, the working can be effected. The X-slider 20 (the hollow cylindrical portion 37) and the ball 66 have shapes sufficient for eliminating loosenesses in the directions of X- and Y-axes, and, in order to further reduce the sliding resistance (to remove the damper effect), an air hole 39 is formed in the cover member 35 of the X-slider 20. In order to secure the uniform measuring forces and restoring forces in every direction on the X and Y planes, the wire spring 63 is aligned with the Z-axis in the non-load state, so that the through-hole 18 of the base 10, a through-hole 33 of the X-slider 20, a top opening 53 of the Z-slider 50, the cylindrical portion 36 (the hollow cylindrical portion 37) of the X-slider 20 and the measuring element 58 (the probe 59) are finished and assembled to be center-aligned with one another. Accordingly, when an external force is applied to the probe 59 in the directions X-axis and/or Y-axis, the X-slider 20 and the Y-slider 40 can slide smoothly in the axial directions thereof against the biasing force of the wire spring 63. On the other hand, while permitting the sliding of both sliders 20 and 40, the wire spring 63 can restore both sliders 20 and 40 to the initial positions (origins) with respect to the base 10, if the external force of removed. When both sliders 20 and 40 move, the ball 66 makes a sliding surface 38 of the cylindrical portion 36 slide in the direction of Z-axis, so that the position of the probe 59 in the direction of Z-axis can be held constant. The biasing force of the wire spring 63 comes to be a contacting force, i.e. measuring force of the probe 59 to the work, and the deforming force in every direction of the wire spring 63 is uniform, so that the measuring force can be made constant in every direction on the X and Y planes. Incidentally, the measuring force can be increased or decreased for adjustment by rotating the nut member 62 to alter the effective length (the position of the ball 66 in the direction of Z-axis) of the wire spring 63.

The Z origin restoring means 71 is formed of a coil spring 72, one end of which is engaged with a top end 73 of the main body 51 of the Z-slider 50, and the other end is couplingly engaged with the cylindrical portion 36 as at 74 positioned inside the main body 51 (engaged with the X-slider 20). In consequence, from this viewpoint, there is no need of providing a plurality of suspension springs around the sliders as in the conventional tracer, thus achieving to simplify the tracer in construction and render the traces compact in size and light in weight. Moreover, it suffices for the coil spring 72 only to support the weights of the Z-slider 50 and the measuring element 58, the coil spring 72 may have a relatively weak biasing force, so that the measuring force can be made small. The coil spring 72 can be made short, so that the dispersion in performance due to the deformation can be made small.

Action will hereunder be described.

In the normal condition where the measuring element, i.e. the probe 59 is in non-contact with the work, the wire spring 63 constituting the X-Y origin restoring means 61 is aligned with the Z-axis, whereby the X-slider 20 and the Y-slider 40 are stationary at predetermined positions with respect to the base 10. Since the Z-slider 50 is balanced in weight by the coil spring 72 constituting the Z origin restoring means 71, the Z-slider 50 is stationary at a predetermined position in the direction of Z-axis with respect to the X-slider 20, i.e. the base 10. In consequence, the measuring element 58 (the probe 59) secured to the Z-slider 50 is held at the origin which is a point of intersection of the X-, Y- and Z-axes.

Here, when the probe 59 is relatively moved while in contact with a surface of the work, not shown, the X-slider 20 is moved in the direction of X-axis by the biasing force to the probe 59 is the direction of X-axis while holding the Z-slider 50. Since the slider member 31 is coupled into the hollow portion 15 of the base 10, the slide member 31 itself does not move in the direction of Z-axis but smoothly moves in the directions other than the Z-axis. The measuring force in this case equals to the restoring force of the wire spring 63 constituting the X-Y origin restoring means 61. When a biasing force in the direction of Y-axis is applied to the probe 59, the Y-slider 40 moves in the direction of Y-axis through the Z-slider 50 and the X-slider 20. The slide members 46l and 46r of this Y-slider 40 are also coupled into the hollow portion 15 of the base 10, and the sliding surfaces 43l and 43r are engaged with the guide surfaces 14l and 14r of the base 10, so that the Y-slider 40 cannot move in the directions of Z-axis and X-axis. According to the present invention, in this case, the X-slider 20 and the Y-slider 40 are directly supported on the base 10 without piling both sliders up, so that the X-slider 20 moves integrally with the Y-slider 40 in the direction of Y-axis as well. The measuring force in the direction of Y-axis also equals to the restoring force of the wire spring 63 of the X-Y origin restoring means 61. Next, when a biasing force in the direction of Z-axis is applied to the probe 59, the Z-slider 50 moves in the X-slider 20 in the direction of Z-axis while compressing the coil spring 72 as being the Z origin restoring means 71. The slider is locked against rotation relative to the slider 20 due to the square shape of the hollow portion 23 and the main body 51. Since the X-slider 20 and the Y-slider 40 are supported to be immovable in the direction of Z-axis in a plane parallel to the base 10, the Z-slider 50 can move only in the direction of Z-axis.

Here, a movement value of the X-slider 20 is detected by the X-sensor (82, 83), a movement value of the Y-sensor 40 by the Y-sensor (85, 86) and a movement value of the Z-slider 50 by the Z-sensor (88, 89). As a result, the displacement detecting means 80 detects a surface contour of the work being in contact with the probe 59 as an electric signal.

Then, when the biasing force in the direction of Z-axis is removed, the Z-slider 50 is returned in the direction of Z-axis by the restoring force of the coil spring 72 (the Z origin restoring means 71) and the probe 59 (the measuring element 58) returns to the Z origin. Similarly, when released from the biasing force in the direction of X-axis, the X-slider 20 is moved in the hollow portion 15 of the base 10 by the restoring force of the wire spring 63 (the X-Y origin restoring means 61) to return to the X-origin, and, when released from the biasing force in the direction of Y-axis, the Y-slider 40 returns to the Y-origin. As described above, the measuring element 58 (the probe 59) is moved in the directions of the three axes perpendicularly intersecting by the function of the neutral position holding means to be restored and held at the X-, Y- and Z-origins.

According to this embodiment, the X-slider 20 and the Y-slider 40 are coupled into the hollow portion 15 defined by the parallel surfaces (16u, 16d) spaced apart in the direction of the Z-axis on the base 10 and directly supported on the base 10 without being piled up in three stages, so that the tracer can be considerably reduced in length (compact in size) in the direction of the Z-axis. The both sliders 20 and 40 slide on the same surface (16u, 16d) and the positional regulation in the direction of Z-axis is effected, so that the interference can be low, and high accuracy and uniform directional properties can be achieved. This means that the sliders and the moving constructions thereof can be easily finished and assembled.

Since the stable construction is adopted in which the X-slider 20 and the Y-slider 40 are directly supported on the base 10, the Z-slider 50 can be supported on the X-slider 20 with satisfactory stability and following properties, and the movement of the Z-slider 50 in the direction of Z-axis does not exert adverse effects on the changes of positions of the X-slider 20 and/or the Y-slider 40. From this viewpoint, high accuracy can be achieved as well.

Since the Z origin restoring means 71 is incorporated in the Z-slider 50, the reduction in length (compact in size) in the directions of X- and Y-axes can be achieved as composed with the conventional construction in which the Z origin restoring means 71 is provided outside the sliders 20, 40 and 50, thus rendering the tracer highly compact in size and light in weight in cooperation with the reduction in length in the direction of Z-axis. Together with this arrangement, it suffices for the coil spring 72 constituting this means 71 to hold the loads of the Z-slider 50 and the measuring element 58 only, so that the biasing force of the coil spring 72 can be weak, thus enabling to reduce the measuring force. Moreover, since the coil spring 72 is the single spring construction provided on the Z-axis, the coil spring 72 does not cause a deflection, error and the like in the directions of X- and Y-axes in the movement in the direction of Z-axis, so that the tracer as a whole can be further improved in measuring accuracy.

Further, based on the construction wherein the X-slider 20 and the Y-slider 40 are directly supported on the base 10, the wire spring 63 constituting the X-Y origin restoring means 61 can be reduced in length, so that the dispersion in performance due to the deformation of the spring can be reduced, and moreover, the restoring forces for moving the both sliders 20 and 40 can be decreased, thus enabling to set the measuring force to a small value. From this viewpoint also, the tracer can be rendered compact in size, light in weight and be improved in measuring accuracy. The tracer can trace a soft article such as a plastic product.

Further, the X-Y origin restoring means 61 and the Z origin restoring means 71 approach each other in the values of the biasing forces and the like to thereby be reduced in lengths thereof, whereby a number of occurrences of natural vibration problems due to the imbalance therebetween is low, and the number of natural vibrations of the tracer itself can be increased because the tracer is rendered compact in size and light in weight, so that errors caused by the resonance of the vibrations of the coordinate measuring instrument can be eliminated. When the starting points of sliding and the like are to be uniformized, there is such an advantage that the uniformizing can be introduced by the utilization of a viscous liquid and a mechanical friction means. The neutral position holding means 60 as a whole can be assured in the simplification and stable operations.

The guide for sliding of the Z-slider 50 over the X-slider 10 and the guide for sliding of the X- and Y-sliders 20 and 40 over the base 10 are carried out through the pneumatic bearings, so that the sliding resistance can be made very small. Moreover, it suffices to use only two air pipes (90, 91).

Incidentally, in the above-described embodiment, the Z-slider 50 is provided at the lowest position with respect to the base 10, however, in short, the X-slider 20 and the Y-slider 40 may be coupled into the hollow portion 15 defined by the parallel surfaces spaced apart in the direction of Z-axis and piled up in two stages. Therefore, the present invention includes such a working wherein the base 10 may be conveniently divided into two, the Z-slider 50 may be provided at the top, and the X-slider 20 and the Y-slider 40 may be supported on the Z-slider 50 via a second base obtained by the division. However, if the construction shown in the above embodiment is adopted, then the Z origin restoring means 71 may be rendered compact in size.

The Z-slider 50 has been supported on the X-slider 20, however, the Z-slider 50 may be supported on the Y-slider 40. Similarly, the distal end 65 (the ball 66) of the wire spring 63 constituting the X-Y origin restoring means 61 has been engaged with the X-slider 20, however, such a working may be adopted that the distal end 65 is directly engaged with the Z-slider 50.

The displacement detecting means 80 may be of an electromagnetic type, an electrostatic type or the like instead of the photoelectric type.

As has been apparent from the foregoing, since the X-slider and Y-slider are directly supported on the base and made to slide in the same plane, the present invention can provide the surface contour measuring tracer rendered compact in size and excellent in the directional properties and responsibility.

What is claimed is:

1. A surface contour measuring tracer comprising a probe element and support means, having a base member, for supporting said probe element for movement in three orthogonally related directions by means of X-, Y- and Z-sliders mounted on said base member, said probe element being adapted to engage and follow a surface of a work while in sliding contact therewith to thereby facilitate a detecting of a surface contour of said work as an electric signal, said Z-slider means including a multi-sided hollow portion defined by side surfaces extending in direction of a Z-axis, respective portions of said X-slider means and said Y-slider means being coupled to said hollow portion, said X-slider means including first bearing means for supporting said X-slider means directly on said base member so as to be movable in the direction of an X-axis and be immovable in the direction of said Z-axis, said Y-slider means including second bearing means for supporting said Y-slider means directly on said base member so as to be movable in the direction of a Y-axis and be immovable in the direction of said X-axis and be immovable in the direction of said Z-axis.

2. The surface contour measuring tracer as set forth in claim 1, further comprising an origin restoring means for holding said X-, Y- and Z-slider means at neutral positions, respectively.

3. The surface contour measuring tracer as set forth in claim 2, wherein said origin restoring means includes an X-Y origin restoring means for holding said X-slider means and said Y-slider means at neutral positions and a Z origin restoring means for holding said Z-slider means at a neutral position.

4. The surface contour measuring tracer as set forth in claim 3, wherein said X-Y origin restoring means is constructed such that said Z-slider means includes a wire spring extending in the direction of said Z-axis and being received into said hollow portion, one end of said wire spring being fixed to said base member and the other end being engaged with said X-slider means while retaining the ability to move in the direction of said Z-axis.

5. The surface contour measuring tracer as set forth in claim 4, wherein the movable end of said wire spring is formed into a spherical shape.

6. The surface contour measuring tracer as set forth in claim 3, wherein said Z origin restoring means includes a coil spring which permits said Z-slider means to move in the direction of said Z-axis against the urging of said coil spring and restores said Z-slider means to the neutral position when a force applied to said Z-slider means in the direction of said Z-axis is released.

7. The surface contour measuring tracer as set forth in claim 1, wherein said base member includes a top plate and a bottom plate which are disposed in parallel relation to each other and extend horizontally a finite distance so as to define a predetermined space portion in the direction of said Z-axis therebetween, said X-slider means and said Y-slider means being formed of block structures which include said first and second bearing means, respectively.

8. The surface contour measuring tracer as set forth in claim 7, wherein said Z-slider means is supported on said X-slider means by third bearing means.

9. The surface contour measuring tracer as set forth in claim 8, wherein said first, second and third bearing means are each pneumatic bearings.

* * * * *